(12) United States Patent
Wantling

(10) Patent No.: US 7,294,189 B2
(45) Date of Patent: Nov. 13, 2007

(54) WAX EMULSION PRESERVATIVE COMPOSITIONS AND METHOD OF MANUFACTURE

(75) Inventor: Steven Wantling, Brandon, MS (US)

(73) Assignee: Hexion Specialty Chemicals, Inc., Columbus, OH (US)

(*) Notice: Subject to any disclaimer, the term of this patent is extended or adjusted under 35 U.S.C. 154(b) by 275 days.

(21) Appl. No.: 11/219,276

(22) Filed: Sep. 2, 2005

(65) Prior Publication Data

US 2006/0009535 A1 Jan. 12, 2006

Related U.S. Application Data

(63) Continuation-in-part of application No. PCT/US04/17627, filed on Jun. 3, 2004, and a continuation-in-part of application No. PCT/US03/17771, filed on Jun. 5, 2003.

(60) Provisional application No. 60/613,577, filed on Sep. 27, 2004, provisional application No. 60/475,924, filed on Jun. 5, 2003, provisional application No. 60/454,168, filed on Mar. 12, 2003, provisional application No. 60/417,770, filed on Oct. 11, 2002.

(51) Int. Cl.
| | |
|---|---|
| C08L 91/06 | (2006.01) |
| D21H 21/16 | (2006.01) |
| D21H 17/26 | (2006.01) |
| D21H 17/60 | (2006.01) |
| C04B 103/65 | (2006.01) |
| C04B 24/38 | (2006.01) |

(52) U.S. Cl. .............. 106/164.3; 106/18.29; 106/781; 162/177

(58) Field of Classification Search .............. 106/18.29, 106/781, 164.3; 162/177
See application file for complete search history.

(56) References Cited

U.S. PATENT DOCUMENTS

| | | |
|---|---|---|
| 2,198,776 A | 4/1940 | King et al. |
| 2,699,414 A | 1/1955 | Selbe |
| 3,370,957 A * | 2/1968 | Royse et al. ............ 426/9 |
| 3,869,414 A | 3/1975 | Campbell |
| 3,891,453 A | 6/1975 | Williams |
| 3,935,021 A | 1/1976 | Greve et al. |
| 4,019,920 A | 4/1977 | Burkard et al. |
| 4,042,409 A | 8/1977 | Terada et al. |
| 4,094,694 A | 6/1978 | Long |
| 4,174,230 A | 11/1979 | Hashimoto et al. |
| 4,239,716 A | 12/1980 | Ishida et al. |
| 4,328,178 A | 5/1982 | Kossatz |
| 4,392,896 A | 7/1983 | Sakakibara |
| 4,421,704 A | 12/1983 | Reily |
| 4,645,548 A | 2/1987 | Take et al. |
| 4,734,163 A | 3/1988 | Eberhardt et al. |
| 4,748,196 A | 5/1988 | Kuroda et al. |
| 5,009,269 A | 4/1991 | Moran et al. |
| 5,120,355 A | 6/1992 | Imai |
| 5,320,677 A | 6/1994 | Baig |
| 5,437,722 A | 8/1995 | Borenstein |
| 5,482,551 A | 1/1996 | Morris et al. |
| 5,695,553 A | 12/1997 | Claret et al. |
| 5,922,447 A | 7/1999 | Baig |
| 5,968,237 A | 10/1999 | Sinnige |
| 5,980,628 A | 11/1999 | Hjelmeland et al. |
| 6,010,596 A | 1/2000 | Song |
| 6,066,201 A | 5/2000 | Wantling |
| 6,162,839 A | 12/2000 | Klauck et al. |
| 6,165,261 A | 12/2000 | Wantling |
| 6,172,122 B1 | 1/2001 | Lawate et al. |

(Continued)

FOREIGN PATENT DOCUMENTS

| | | |
|---|---|---|
| WO | WO 03/004433 A1 | 1/2003 |
| WO | WO 2004/033581 | 4/2004 |

OTHER PUBLICATIONS

Hideki, Takiguchi, Japanese Patent Abstract, Publication No. 61018705, Publication Date (Jan. 1, 1986) IG Tech Res Inc., Midew-Proofing Gypsum Board.
PCT Search Report dated (Oct. 31, 2005).

Primary Examiner—David M. Brunsman

(57) ABSTRACT

An emulsion comprising water as the continuous phase, a wax as the discontinuous phase, an emulsifier and a preservative having the general structure:

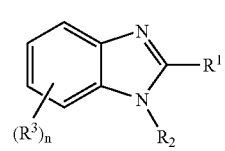

(I)

wherein $R^1$ can be a heterocycle containing nitrogen and sulfur, such as thiazolyl, isothiazolyl, or thiadiazolyl, which can optionally be substituted with $C_1$–$C_6$ alkyl; $R^2$ can be hydrogen or $C_1$–$C_6$ alkyl, specifically hydrogen; n is 0, 1, 2, or 3; each instance of $R^3$ can independently be hydrogen, $C_1$–$C_6$ alkyl, phenoxy, $C_1$–$C_6$ alkoxy, halo, amino, $C_1$–$C_6$ alkylamino, di $C_1$–$C_6$ alkyl amino, imidazolyl, thiazolyl, isothiazolyl, thiadiazolyl, thienyl, furyl, pyrryl, naphthyl, phenyl, halophenyl, $C_1$–$C_6$ alkyl phenyl, or $C_1$–$C_6$ alkoxyphenyl. The preservative may be added to the emulsion after the emulsion is formed. The emulsion can be incorporated into a gypsum product such as gypsum board or gypsum wood fiber board. The gypsum product may be made by forming a slurry containing gypsum, water, and the emulsion into a solid product. A method for improving the water resistance of a lignocellulosic composite product prepared by mixing lignocellulosic material with a binder to form a mixture and solidifying the mixture in a selected configuration to form the composite product may include adding to the mixture an emulsion as described above.

32 Claims, No Drawings

U.S. PATENT DOCUMENTS 6,231,656 B1   5/2001   Dekerf et al.
6,251,979 B1   6/2001   Luongo
6,287,495 B1   9/2001   Rosthauser
6,558,685 B1   5/2003   Kober et al. ................ 424/405
6,673,144 B2   1/2004   Immordino, Jr. et al.

* cited by examiner

WAX EMULSION PRESERVATIVE COMPOSITIONS AND METHOD OF MANUFACTURE

This is a Non-Provisional application, which claims benefit to priority on US 60/613,577 filed Sep. 27, 2004. This application is a continuation-in-part of International Application PCT/US04/17627, with an international filing date of Jun. 3, 2004, which claimed benefit to U.S. 60/475,924 filed Jun. 5, 2003 and which has published in English on 16 Dec. 2004 as WO 2004/108625. This application is also a continuation-in-part application of International Application PCT/US03/17771, with an international filing date of Jun. 5, 2003, published in English on 22 Apr. 2004 as WO2004/033581, which claims benefit to both U.S. 60/417,770 filed Oct. 11, 2002, and U.S. 60/454,168, filed Mar. 12, 2003. All of the foregoing applications are incorporated herein by reference in their entireties.

BACKGROUND OF THE INVENTION

Certain properties of gypsum (calcium sulfate dihydrate) make it very popular for use in making industrial and building products; especially gypsum board and gypsum wood fiber (GWF) products. It is a plentiful and generally inexpensive raw material which, through a process of dehydration and rehydration, can be cast, molded or otherwise formed to useful shapes. The base material from which gypsum board is manufactured is the hemihydrate form of calcium sulfate (gypsum), commonly termed stucco, which is produced by the heat conversion of the dihydrate from which the water phase has been removed.

The manufacture of gypsum products generally comprises preparing a gypsum-containing slurry that contains gypsum and other components of the finished product, and then processing the slurry to remove the water and form and dry the remaining solids into the desired form. In the making of gypsum board, the gypsum slurry must flow onto a paper substrate. In a continuous process, the slurry/substrate combination is then sized by passing this combination between rollers. Simultaneous with this sizing step, a paper backing is positioned over the sized gypsum slurry. Accordingly, the gypsum slurry must possess sufficient fluidity so that a properly sized gypsum board can be made. Fluidity refers to the ability of the gypsum slurry to flow.

It is also important to the manufacture of gypsum board, that the gypsum slurry be capable of being foamed to a limited extent. Foamability refers to this ability to be foamed. When the gypsum slurry and paper substrate are passed through the sizing rollers, a certain amount of the gypsum slurry must back flow and accumulate in the rollers nip so that a steady flow of gypsum is delivered to the sizing rollers. Foamability is important to this ability of the gypsum slurry to back flow at the rollers nip. Forming plates may be used, eliminating the use of a master roll, but foam is important to control density of the finished product. Because of the continuous nature of a gypsum board manufacturing process wherein the gypsum slurry flows onto a substrate which then passes through sizing rollers, the extent to which the gypsum slurry flows after it is sized is critical to maintaining the finished product dimensions of the gypsum board. The time at which the gypsum slurry ceases its flow is referred to as the pre-set tine. Therefore, pre-set time is an important property of the gypsum slurry. The set time of the gypsum slurry is also an important property. The set time refers to the amount of time it takes the gypsum slurry to be dried, under heat, to the finished, solid gypsum board. As is well known in the art, in a continuous gypsum board manufacturing process, it is important that the gypsum slurry possess a consistent set time.

Unlike the production of gypsum board, the production of gypsum wood fiber (GWF) products is facilitated through a conventional paper making process. The process of water felting dilute aqueous dispersions of various fibrous materials is a well-known commercial process for manufacturing many types of paper and board products. In this process, an aqueous dispersion of fiber, binder and other ingredients, as desired or necessary, is flowed onto a moving foraminous support wire, such as that of a Fourdrinier or Oliver mat forming machine, for dewatering. The dispersion may be first dewatered by gravity and then dewatered by vacuum suction means; the wet mat is then pressed to a specified thickness between rolls and the support wire to remove additional water. The pressed mat is then dried in heated convection or forced air drying ovens, and the dried material is cut to the desired dimensions. The manufacture of gypsum wood fiber products may be carried out similarly, utilizing a wet end section headbox distribution mechanism distributing the gypsum wood fiber slurry onto a vacuum wire for initial mat formation and dehydration followed by compression through a series of vacuum belt rolls and into a kiln for final dehydration. The gypsum wood fiber product does not incorporate paper face and back paper but rather is a paperless core that has similar performance and uses comparable to conventional sheathing products currently available.

Gypsum absorbs water, which reduces the strength of the products in which it is used and enables deleterious biological activity, such as the growth of mildew, mold, etc., to occur therein and thereon. Prior art products, like ordinary gypsum board, gypsum tile, gypsum block, gypsum casts, and the like have relatively little resistance to water. When ordinary gypsum board, for example, is immersed in water, the board quickly absorbs a considerable amount of water, and loses a great deal of its strength. Tests have demonstrated that when a 2 inch by 4 inch cylinder of gypsum board core material was immersed in water at about 70° F. the cylinder showed a water absorption of 36% after immersion for 40 minutes.

Attempts to provide water-resistant properties to gypsum board include incorporation of asphalt, metallic soaps, resins, and wax additives into an aqueous gypsum slurry. The resulting materials were difficult to use and the core properties difficult to control. Polysiloxane-based systems have also been used in attempts to impart water resistance to gypsum board. Finished gypsum products have also been coated with water-resistant films or coatings. One specific example of a past attempt to provide a water-resistant gypsum product is the spraying of a molten paraffin, wax or asphalt into an aqueous gypsum slurry.

Another example of a prior art attempt to provide a water-resistant gypsum product is the addition of an emulsion of wax, such as paraffin wax, and asphalt, in the relative proportions of from about 1 part to about 10 parts of asphalt per part of wax to the aqueous gypsum slurry. Polyvinyl alcohol has been used in an attempt to provide a room temperature system for use in adding water-resistant properties to gypsum.

Some emulsions include generic starch species, e.g., from corn, sago, wheat, rice, etc., with a complexing agent such as sodium borate in combination with other chemical compounds, specifically sodium lignosulfate, C24 and greater polymerized alkyl phenol and various waxes. While this system shows significant advantages over previously available wax emulsions it to suffers from a number of deficiencies, including: degradation of the pH due to bacteriological activity resulting from the decomposition of the sodium lignosulfate in long-term storage, viscosity changes as temperature and age occur manifesting itself as a slight separation at the water/wax interface, and less than predictable use rates at the mixer due to the changes occurring singularly and in combination.

The panel board industry, includes, but is not limited to, plywood, OSB (Oriented Strand Board) (commonly referred to as flake or wafer board), medium density fiber board, particleboard, and other products, inclusively referred to herein as lignocellulosic composite products. In each of these composite products and in lumber (the wood of trees cut and prepared for use as building material) (collectively referred to herein as "lignocellulosic products") it is desirable to control the water absorption or "uptake" and swelling, both of which have detrimental affect on the utility of the product. For example, in plywood used for floor underlay, swelling causes buckling or creep in the final wood or tile overlay. Similar problems occur with swelled OSB used as a roofing member applied to areas which will experience moisture. These composite board panels, like wood and other lignocellulosic products, are also known to deteriorate on the job site due to open storage, as a result of water uptake, which leads to biological degradation resulting from the growth of, and infestation by, bacteria, fungi, and insects.

Lignocellulosic composite products are conventionally manufactured by hot pressing lignocellulosic materials with wax and thermosetting resin. This is referred to as a conventional bonding process. The wax is a sizing agent to improve the water resistance of the composite. The resin is a bonding agent that holds the materials comprising the composite together, thus forming them into a unitary shape. Resoles are commonly used as the binding resin for lignocellulosic composite products.

In the conventional hot press method of manufacture of lignocellulosic composite products, a lignocellulosic material is combined with a phenolic resin and other components in a blender or mixer. The blend or mixture that results is pressed, typically under pressures above atmospheric and temperatures greater than room temperature, to produce the composite. Lignocellulosic materials used in the production of mats may be selected from the group consisting of wood fiber, wood flake, wood strands, wood chips and wood particles, and mixtures thereof. The lignocellulosic materials listed here are referred to in the art as wood furnish. However, it is well known that other wood furnish, such as straw, bagasse, wood bark, recycled wood fiber, recycled paper fiber, and mixtures thereof, may also be used. The wood furnish, once blended or mixed with the phenolic resin, is then formed onto a support material to make a pre-form in the approximate shape of the finished good. The pre-form is then placed on a caul plater in a hot press where the finished good is produced by applying pressures above atmospheric and temperatures greater than room temperature. The elevated temperatures and pressures cause the phenolic resin to polymerize, thus binding the pre-form into a unitary finished good. The hot press method is further described in U.S. Pat. No. 4,433,120 to Shui-Tung Chiu.

There remains a need for an additive which is useful in imparting resistance to biological growth on gypsum products, and which is economical to employ. When biocides are added to a gypsum product, it is common to over spray the face and/or backing paper of the products with mildew resistant chemicals. There also remains a need for a useful and effective preservative for lignocellulosic composite products.

SUMMARY OF THE INVENTION

The above described and other features are exemplified by the following detailed description.

An emulsion comprising water as the continuous phase, a wax as the discontinuous phase, an emulsifier and a preservative has the general structure:

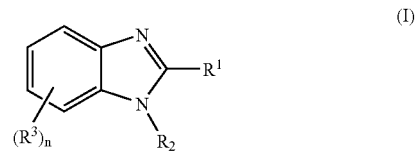

(I)

wherein $R^1$ can be a heterocycle containing nitrogen and sulfur, such as thiazolyl, isothiazolyl, or thiadiazolyl, which can optionally be substituted with $C_1$–$C_6$ alkyl; $R^2$ can be hydrogen or $C_1$–$C_6$ alkyl, specifically hydrogen; n is 0, 1, 2, or 3; each instance of $R^3$ can independently be hydrogen, $C_1$–$C_6$ alkyl, phenoxy, $C_1$–$C_6$ alkoxy, halo, amino, $C_1$–$C_6$ alkylamino, di $C_1$–$C_6$ alkyl amino, imidazolyl, thiazolyl, isothiazolyl, thiadiazolyl, thienyl, furyl, pyrryl, naphthyl, phenyl, halophenyl, $C_1$–$C_6$ alkyl phenyl, or $C_1$–$C_6$ alkoxyphenyl.

A method for making a wax emulsion comprises making the emulsion without a preservative as defined herein, and then adding the preservative thereto.

A gypsum product comprises gypsum and a preservative as defined herein.

A method for making a gypsum product comprises forming a slurry from gypsum, water, and a wax-in water emulsion containing a preservative as described herein, and forming the slurry into a solid product.

A method for improving the water resistance of a lignocellulosic composite product prepared by mixing lignocellulosic material with a binder to form a mixture and solidifying the mixture in a selected configuration to form the composite product, comprises adding to the mixture an emulsion as defined herein.

A lignocellulosic composite product made by mixing lignocellulosic material with a binder to form a mixture, adding to the mixture an emulsion as defined herein, and forming the mixture and the emulsion therein into a solid product.

DETAILED DESCRIPTION

A type of preservative has been found to be particularly advantageous in wax emulsions, especially in wax emulsions used in the manufacture of gypsum products and wood fiber board and other lignocellulosic composite products.

The preservatives disclosed herein are useful for inhibiting biological growth, e.g., the growth of mildew, fungi, etc., on gypsum products. As used herein "preservative" includes biocides such as bactericides, fungicides, algaecides, mildewcides, or a combination thereof. Exemplary preservatives include the compositions disclosed in U.S. Pat. No. 3,370,957 to Wagner et al., which is incorporated in its entirety herein, and which discloses preservatives according to the general structure (I):

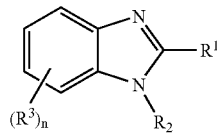

wherein $R^1$ can be a heterocycle containing nitrogen and sulfur, such as thiazolyl, isothiazolyl, or thiadiazolyl, which can optionally be substituted with $C_1$–$C_6$ alkyl; $R^2$ can be hydrogen or $C_1$–$C_6$ alkyl, specifically hydrogen; n is 0, 1, 2, or 3; each instance of $R^3$ can independently be hydrogen, $C_1$–$C_6$ alkyl, phenoxy, $C_1$–$C_6$ alkoxy, halo, amino, $C_1$–$C_6$ alkylamino, di $C_1$–$C_6$ alkyl amino, imidazolyl, thiazolyl, isothiazolyl, thiadiazolyl, thienyl, furyl, pyrryl, naphthyl, phenyl, halophenyl, $C_1$–$C_6$ alkyl phenyl, $C_1$–$C_6$ alkoxyphenyl, and the like.

Particular embodiments of the mildewcide include those according to the general structures (II) and (III):

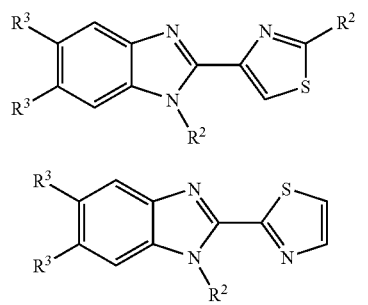

wherein $R^1$, $R^2$, and $R^3$ are as defined previously.

Exemplary mildewcides according to structure (I) include: 2-(4'-thiazolyl) benzimidazole; 2-[3'-(1',2',5'-thiadiazolyl)] benzimidazole; 2-(4'-thiazolyl)-5-methoxy benzimidazole; 2-(4'-thiazolyl)-5-phenoxy benzimidazole hydrochloride; 2-(2'-methyl-4'-thiazolyl) benzimidazole; 2-[4'-(1', 2',3'-thiadiazolyl)] benzimidazole; 1-acetyl-2-(4'-thiazolyl)-5-phenyl benzimidazole; 2-(4'-isothiazolyl) benzimidazole; 2-(4'-thiazolyl)-6-fluoro benzimidazole; 2-(4'-thiazolyl)-5-amino benzimidazole; 2-(2'-thiazolyl)-5-(1'-imidazolyl) benzimidazole; 2-(4'-isothiazolyl)-5-chlorobenzimidazole; 2-(4'-thiazolyl)-5-phenyl benzimidazole; 2-[4'-(1',2',3'-thiadazolyl)]-5-(4'-tolyl) benzimidazole; 1-acetyl-2-(2'-thiazolyl)-5-phenyl benzimidazole; 1-methyl-2-(2'-isothiazolyl)-5-(2'-methoxyphenyl) benzimidazole; 2-(4'-isothiazolyl)-5-furyl benzimidazole; 2-(4'-thiazolyl)-5-(4'-fluorophenyl) benzimidazole hydrochloride; 2-(4'-thiazolyl)-5-bromo benzimidazole; 2-(4'-thiazolyl)-5-chloro benzimidazole; 2-(2'-thiazolyl)-5-methoxy benzimidazole; 2-(4'-thiazolyl)-5-(2'-fluorophenyl) benzimidazole hydrochloride; 2-[3'-(1',2',5'-thiadiazolyl) 1-5-methylthio benzimidazole; 2-(4'-thiazolyl)-5,6-difluoro benzimidazole; 1-benzoyl-2-(4'-thiazolyl) benzimidazole; 2-(2'-thiazolyl)-5-(2'-pyrryl) benzimidazole; 1-methyl-2-(4'-isothiazolyl) benzimidazole hydrochloride; 2-(4'-thiazolyl)-5-phenoxy benzimidazole; 2-[3'-(1',2', 5'-thiadiazolyl)1-5-methoxy benzimidazole; 1-ethyl-2-(4'-thiazolyl)-5-(2'-thiazolyl) benzimidazole; 1-acetyl-2-[3'-(1',2',5'-thiadiazolyl)]-5-(2''-furyl) benzimidazole; 2-(4'-thiazolyl)-4-fluoro benzimidazole hydrochloride; 2-(2'-thiazolyl) benzimidazole; 1-acetyl-2-(4'-thiazolyl) benzimidazole; and combinations thereof. In a particular embodiment described below, thiabendazole (2-(4'-thiazolyl) benzimidazole) has been found to be effective in inhibiting the growth of biological agents on gypsum board, thus indicating the advantageous utility of benzimidole compounds generally and the other preservatives indicated herein.

Preferably, the preservative is added as the last ingredient in the wax emulsion, i.e., the preservative is 'post-added' to the already-formed wax emulsion. The preservative may be present in the wax emulsion in an amount of 0.01 to 10% by weight of the wax emulsion (wt. %), optionally 0.1 to 5 wt. %, for example, 0.2 to 4 wt. %. The preservative may be added in any convenient form, including a 100% solids, as a hydrated paste or in a water diluted system, e.g., 25–50% active thiabendazole. The preservative is preferably added with agitation, which is believed to thoroughly disperse the preservative into the discontinuous wax phase of the emulsion. Optionally, one or more of these biocides or the others mentioned below may employed in an amount calculated to be about 0.0025% to about 0.2% by weight of the finished gypsum product. The preservative is post-added to the wax emulsion under severe agitation to any desired wax emulsion where the water phase is the continuous phase in amounts ranging from 0.01 to 5% (percent) by volume. The resulting wax emulsion can be used in the preparation of gypsum products and does not have significant affect on the desired properties of the finished products, i.e., strength, facing bonds, and water resistance where applicable. The emulsions may be added to mixtures of gypsum and water without adversely affecting properties of the mixture which are necessary to the manufacture of gypsum products such as gypsum board and GWF. Such properties include fluidity, formability and set time. In the manufacture of gypsum wallboard products it is important to impart water resistance to the finished product, so as to limit the maximum water absorption realized by the wallboard in a defined board soak test. For example, American Standards for Testing Materials ASTM 1396 and sub parts thereof describe such a test.

Generally, the preservative may be used in wax emulsions emulsified with various wax emulsions useful in the production of gypsum products, including emulsions containing stearic/oleic acid amine combinations where the amine structure can be described as TEA, DEA, AMP, Morpoline and other fatty acid amine systems normally considered known art; emulsions where a lignin sulfate or sulfonate acting as the surfactant in combination with various waxes; and emulsions comprising complex combinations consisting of starch compounds and metallic salts and calcium phenates, long branched chain calcium alkyl phenols, long straight chain calcium alkyl phenols, complex polymers of maleic acid with and without an amine attachment, and long chain, C 30 and above alkyl phenols, and wax or a combination of waxes. Some non-limiting examples of such emulsions are provided below. The addition of the preservative provides an emulsion which, when incorporated into a gypsum slurry, will provide resistance from mildew and other biological activity from occurring to a finished gypsum product while retaining the desired properties of the finished product, i.e., strength, facing bonds, and water resistance where applicable. In addition, the use of these preservatives has been found to result in increased product strength relative to the use of other preservatives.

Wax emulsions containing the preservatives described herein may also be added to the resin used in making various kinds of panel board that do not contain gypsum.

In one embodiment, the preservative may be used in a wax emulsion that contains starch, optionally a complexed starch. In one embodiment, such an emulsion may include a wax, an alkyl phenol, a polynaphthalenesulfonic acid, an alkali metal hydroxide, and a complexed starch. The polynaphthalenesulfonic acid and the alkali metal hydroxide react to give a salt of polynaphthalenesulfonic acid. Such emulsions may be prepared by (a) mixing the wax and an alkyl phenol to provide a first pre-mix; (b) mixing polynaphthalenesulfonic acid, an alkali metal hydroxide, water, and a complexed starch to provide a second pre-mix; (c) combining the first pre-mix and the second pre-mix to provide a mixture; and (d) homogenizing the mixture.

Waxes useful in making the various embodiments of the present invention may be selected from any of the commercially known waxes which have a melting point of from about 120° F. to about 150° F., and preferably from about 135° F. to about 145° F. Such waxes are typically of low volatility, exhibiting less than about a 10% loss in weight during standard thermogravimetric analysis. Also, the oil content of these waxes is typically less than about 1% by weight. These waxes are of a relatively high molecular weight, having an average chain length of C36 (that is a 36 carbon chain length), or greater.

In certain embodiments, it is useful to saponify one or more of the waxes. In this way, the saponified wax functions as an added surfactant. Waxes useful in this respect are limited to waxes having an acid value or a saponification value and a melting point greater than about 180° F. Saponification of such waxes may be accomplished by combining the wax with a strongly basic material such as ammonium hydroxide or an alkali metal hydroxide such as sodium hydroxide or potassium hydroxide. Waxes which may be saponified in the preparation of emulsions described herein include waxes from the liquefication of coal, vegetable waxes and oxidized waxes resulting from the processing and/or refining of slack wax, scale wax or crude petroleum. For example, saponifiable waxes include montan wax, carnauba wax, beeswax, bayberry-myrtle wax, candelilla wax, caranday wax, castor bean wax, esparto grass wax, Japan wax, ouricury wax, retano- (or retamo-) ceri mimbi wax, shellac, spermaceti wax, sugar cane wax, wool-lanolin wax, and others. The alkali metal hydroxide may be provided in the form of a concentrated aqueous solution that may comprise about 45% alkali metal hydroxide, by weight. Ammonium hydroxide may be provided in solid form. Some or all of the saponifier may also react with the dispersant, and/or with other component ingredients of the emulsion, in situ. Although ammonium hydroxide is sometimes objected to because of the ammonia odor it produces, ammonium hydroxide is believed to be advantageous because, in addition to saponifying the wax, the ammonia can serve as a scavenger for formaldehyde in the resin with which the emulsion is used, and may thus reduce the emission of formaldehyde from the finished composite product. The combination of ammonium hydroxide with formaldehyde also ameliorates the ammonium hydroxide odor, so in some embodiments, formaldehyde may be added to the emulsion for this purpose, for example, in an amount of about 0.02 to about 0.1% by weight. In addition, ammonium hydroxide is especially advantageous for when the emulsion is used with lignocellulosic materials comprising northern wood species, i.e., Douglas fir, aspen and the like. The amount of strongly basic material needed to saponify a wax may be calculated based on the saponification value of the 5 wax. For example, the saponification value divided by 1000 equals the grams of potassium hydroxide to add per gram of wax.

Suitable, non-saponifiable, waxes include a wax having a melting point greater than about 120° F. (about 49° C.), e.g., about 120° F. to about 165° F. (about 49°C. to about 74° C.), optionally about 120° F. to about 150° F. (about 49° C. to about 66° C.), and preferably about 135° F. to about 145° F. (about 57° C. to about 63° C.). Suitable nonsaponifiable waxes include paraffin waxes, slack waxes and scale waxes. Such waxes are commercially known to be of low volatility, exhibiting less than about a 10% loss in weight during standard thermogravimetric analysis. Also, the oil content of these waxes is typically less than about 5% by weight, preferably less than about 1% by weight. Some of these waxes are of a relatively high molecular weight, having an average chain length of C36, that is a 36 carbon chain length, or greater. Paraffin waxes are typically derived from light lubricating oil distillates and are predominantly straight chain hydrocarbons having an average chain length of 20 to 30 carbon atoms. Suitable paraffin waxes include Wax 3816 available from Honeywell/Astor of Duluth, Ga. Slack waxes are petroleum waxes having an oil content of 3 wt. % to 50 wt. %. Suitable slack waxes include Exxon 600 Slack Wax and Ashland 200 Slack Wax, and a combination of 50 parts Exxon 600 Slack Wax and 50 parts Ashland 200 Slack Wax.

Starch used in the emulsions of the present invention is complexed starch. The starch may be complexed in situ, during manufacture of the emulsion, or the starch may be pre complexed prior to being added to the emulsion. Starch is preferably complexed by mixing the starch with a complexing agent such as a borate compound, a molybdate compound or a molybdenum compound. For example, a preferred borate compound is sodium tetraborate decahydrate. For example, a preferred molybdate compound is ammonia hepta molybdate. For example, a preferred molybdenum compound is molybdenum disulfide. Other compounds useful in complexing starch include ammonium biborate, ammonium pentaborate, potassium pentaborate, potassium tetraborate, lithium tetraborate, and magnesium borate compounds; ammonium dimolybdate, ammonium heptamolybbate, barium molybdate, calcium molybdate, lithium molybdate, magnesium molybdate, sodium molybdate, and potassium molybdate; and other molybdenum compounds, and the like.

The starch useful in making the complexed starch of the present invention includes, but is not limited to, corn, rice, wheat, potato, sago and other starches.

The ratio of completing agent (a borate compound, a molybdate compound, or a molybdenum compound) to starch is important to the functionality of the complexed starch in the emulsions. It has been found) that the ratio may be as low as 1:20, of complexing agent (a borate compound, a molybdate; compound, or a molybdenum compound) to starch on a weight per weight basis. The ratio may be as high as 1:3.5, however it has been found that at this ratio, and higher ratios, a greater amount of completed starch is needed in the emulsion to maintain the balance of desired properties in the gypsum mixture and final gypsum product. These desired properties include fluidity, formability, and water-resistance.

Borate compounds, molybdate compounds, and molybdenum compounds are surprisingly effective complexing agents. Examples of useful complexing agents include, but are not limited to, sodium borate (borax), magnesium borate, and other borate compounds, ammonium molybdate, sodium molybdate, magnesium molybdate, and other molybdate compounds, molybdenum disulfide and other molybdenum compounds. The ratio of complexing agent (for example, sodium tetraborate decahydrate, sodium molybdate dehydrate, molybdenum disulfide, or other compounds) to the modified starches significantly influences the control of other necessary properties in the board/slurry process, i.e., foam support and slurry additive compatibility.

Incorporating alkyl phenols into the emulsions has been found useful in achieving low water absorption in gypsum products. As used herein, "alkyl phenols" refer to phenolic compounds having a long chain alkyl group. The long chain alkyl group may be straight or branched. The long chain alkyl group may be C24–C34 (from 24 to 34 carbon 0 chain length), preferably C24–C28. Such alkyl phenols include long chain, C24–C34 (from 24 to 34 carbon chain length) polymerized methylene-coupled alkyl phenol, phenate salts, calcium phenates, long branched chain calcium alkyl phenols, long straight chain calcium alkyl phenols and complex polymers of maleic acid with and without an amine group substitution.

The alkyl group of the alkyl phenol can be derived from a corresponding olefin; for example, a C26 alkyl group is derived from a C26 alkene, preferably a 1-alkene, a C34 alkyl group is derived from a C34 alkene, and mixed length groups are derived from the corresponding mixture of olefins. When the alkyl group is an alkyl group having at least about 30 carbon atoms, however, it may be an aliphatic group (or a mixture of such groups) made from homo- or interpolymers (e.g., copolymers, terpolymers) of mono- and di-olefins having 2 to 10 carbon atoms, such as ethylene, propylene, butene-1, isobutene, butadiene, isoprene, 1-hexene, and 1-octene. Aliphatic hydrocarbyl groups can also be derived from halogenated (e.g., chlorinated or brominated) analogs of such homo- or interpolymers. Such groups can, however, be derived from other sources, such as monomeric high molecular weight alkenes (e.g., 1-tetracontene) and chlorinated analogs and hydrochlorinated analogs thereof, aliphatic petroleum fractions, particularly paraffin waxes and cracked and chlorinated analogs and hydrochlorinated analogs thereof, white oils, synthetic alkenes such as those produced by the Ziegler-Natta process (e.g., poly(ethylene) greases) and other sources known to those skilled in the art. Unsaturation in the hydrocarbyl groups can be reduced or eliminated, if desired, by hydrogenation according to procedures known in the art. Preparation by methods and materials that are substantially free from chlorine or other halogens is sometimes preferred for environmental reasons. More than one alkyl group can be present, but usually no more than 2 or 3 are present for each aromatic nucleus in the aromatic group. Most typically only one hydrocarbyl group is present per aromatic moiety, particularly where the hydrocarbyl-substituted phenol is based on a single benzene ring.

One example of an alkyl phenol useful in the emulsions described herein is available from Lubrizol Chem. Corp. Wycliffe, Ohio, under the trade designation 319H, described as a $C_{24}$–$C_{34}$ polymerized methylene-coupled alkyl phenol. Various other, commercially available alkyl phenols that may be used in these emulsions, include the following (identified by arbitrary identifier numbers in the following Table 1:

TABLE 1

| Identification No. | Description | Source |
| --- | --- | --- |
| 319A | Complex polymer of maleic acid (no amine group substitution) | "Flozol 140" Lubrizol Chem. Corp. Wycliffe, Ohio |
| 319B | Complex polymer of maleic acid (with amine group substitution) | "Flozol 145" Lubrizol Chem. Corp. Wycliffe, Ohio |
| 319C | Straight chain, long chain alkyl phenol | Lubrizol Chem. Corp. Wycliffe, Ohio |
| 319D | Calcium Phenate | Lubrizol Chem. Corp. Wycliffe, Ohio |
| 319E | Branched chain, long chain alkyl phenol | Lubrizol Chem. Corp. Wycliffe, Ohio |
| 319H | C 24–C 34 polymerized methylene-coupled alkyl phenol | Lubrizol Chem. Corp. Wycliffe, Ohio |

The alkyl phenol and product of the reaction of an alkyl phenol with a saponifier or with any other component of the emulsion is referred to herein as the alkyl phenol component.

Such emulsions provide an alternative to the use of sodium lignosulfate or lignosulfonate previously used as both a co-surfactant and a dispersing aid, further reducing the need for a biocide to control biological activity. (The preservatives disclosed herein could, however, be used in emulsions comprising lignosulfate or lignosulfonate.) The ratios of starch:borate, or starch: molybdate, or starch: molybdenum compound may be about 4:1 to about 20:1 on a weight/weight basis.

Emulsions may be prepared by heating the wax and surfactants ("wax mixture") in one vessel and the water, complexing agent (a borate compound, a molybdate compound, or a molybdenum compound) and corn starch ("water mixture") in another vessel. Both mixtures were heated, with mixing, to about 185° (85° C.). Next, the wax mixture was poured into the water mixture under mixing. The resultant mixture was then placed in a homogenizer.

With homogenization it is preferred that a distribution of micelle diameters ranging from about 0.6 micron to about 1.8 micron be achieved. However, the distribution of micelle diameters may range from about 0.5 micron to about 2.5 micron. This level of homogenization may be attained, for example, by using a dual orifice homogenizer operating at from about 2,000 to about 4,000 psi.

It is preferred that the homogenized mixture be cooled after the homogenization step.

It is most preferable that the homogenized mixture be cooled from approximately 185° F. to about 100° F. This may be accomplished by running the homogenized mixture through a cooling coil immersed in water maintained at room temperature.

More specifically, an emulsion may be prepared by combining water, a complexing agent (that is, a borate compound, a molybdate compound, or a molybdenum compound) and a starch to make the complexed starch useful in certain embodiments. Polynaphthalenesulfonic acid and potassium hydroxide are added to the aqueous solution of complexed starch. This mixture is brought to a temperature of about 185° F. to about 205° F. and held until the starch reaches its maximum state of gelation, which typically occurs in about 20 to about 30 minutes. The wax compounds are incorporated with the polymerized alkyl phenol and brought to a temperature of about 185° F. to about 205° F. Then, the wax phase is added to the water phase and reacted to form an in situ surfactant. A detergent/dispersant is formed by the combination and reaction of the polymerized alkyl phenol and the polynaphthalenesulfonic acid, which acts to modify the wax crystal and allows the wax crystals to resist plating and linking with themselves and instead remain in a disassociated state until they are transferred due to polarity to the gypsum. The reacted system is then passed through a homogenizer at a pressure of about 2,000 to about 4,000 psi and then cooled at a prescribed rate to control the stability and viscosity of the finished wax emulsion. The homogenized composition exits the homogenizer at a temperature of about 135° F. to about 145° F. The mixture is then cooled to about 80° F. to about 110° F. The cooling rate is controlled to avoid causing the wax to recrystallize and breakout of solution.

By utilizing the modified starch compounds in combination and proper ratios with other noted compounds, a low viscosity system can be developed allowing a broader range of solids, from about 40% to about 60% by weight to be available and usable.

In certain embodiments which use a single wax additive, it has been found that a dual surfactant system provides a stable emulsion at both room temperature and elevated temperatures. Such stable emulsions may be added, for example, to hot or boiling water, without the emulsion separating or curdling.

One example of dual surfactants is a combination of dodecylisopropanolamine benzene sulfonate and a nonionic ethoxylated aryl phenol.

Dodecylisopropanolamine benzene sulfonate may be obtained from Unichema, Wilmington, Del., under the trade name SD1121. One nonionic ethoxylated aryl phenol is Ethox 2938, available from Ethox Corp., Greenville, S.C. Alternatively, an alkoxylated fatty acid ester may be combined with the of dodecylisopropanolamine benzene sulfonate to form the dual surfactant system. One alkoxylated fatty acid ester is Ethox 2914, also available from Ethox Corp. It has also been found that in certain embodiments of the present invention a dispersing aid, or fluidity modifier, is useful for the maintenance of the fluidity of the gypsum/ emulsion mixture. Such dispersing agents are strong lipophiles, which are, consequently, good defoamers. One such dispersing agent is poly(oxy-1,2-ethanedyl), alpha phenyl-omega-hydroxy styrenate.

An emulsion can be formed by combining and homogenizing a single wax, a dual surfactant system, an alkyl phenol and a complexed starch. Table 1 below provides examples.

TABLE 1

| Component/<br>Parameter | Emulsion A | Emulsion B | Emulsion C |
|---|---|---|---|
| | (amount of component, grams) | | |
| Wax 3816 | 135.0 | 134.5 | 134.5 |
| 319H | 4.0 | 4.0 | 4.0 |
| Ethox 2914 | 14.0 | 12.0 | 12.0 |
| SD1121 | 4.0 | 4.0 | 4.0 |
| Water | 240.0 | 240.0 | 240.0 |
| Borax | 0.5 | 0.5 | 0.5 |
| Corn Starch | 2.5 | 5.0 | 5.0 |
| KOH | 3.0 | 3.0 | 3.0 |

Other wax emulsions that may include the preservatives disclosed herein include those that contain (1) simple stearic/oleic acid amine combinations where the amine structure can be described as TEA, DEA, AMP, Morpoline and other fatty acid amines, and (2) a lignin sulfate or sulfonate acting as the surfactant in combination with various waxes.

An emulsion can be formed by combining and homogenizing two or more waxes, a co surfactant, an alkyl phenol and a complexed starch. Typical composition ranges for two-wax emulsions are provided in Table 2 below.

TABLE 2

| Component | Typical Amount (% weight basis) |
|---|---|
| First Wax | 25–40 |
| Saponifiable Wax | 2.5–4.5 |
| Alkyl Phenol | 0.25–10.0 |
| Polynaphthalenesulfonic Acid | 0.25–5.0 |
| Water | 55–65 |
| Starch + Complexing Agent (4:1 to 20:1) | 1.5–3.5 |
| Alkali Metal Hydroxide | Amount used depends on amount of saponifiable wax; typically 0.5–1.5 |

Table 3 below provides examples of emulsions made according to a dual-wax embodiment.

TABLE 3

| Component/<br>Parameter | Emulsion D | Emulsion E | Emulsion F | Emulsion G |
|---|---|---|---|---|
| | (amount of Component, % by wt) | | | |
| Wax 3816D | 33.00 | 33.00 | 36.00 | 38.00 |
| Montan Wax | 3.30 | 3.30 | 3.60 | 3.80 |
| Alkyl Phenol | 0.50 | 0.50 | 0.50 | 0.50 |
| DISAL GPS | 1.00 | 1.00 | 1.20 | 1.50 |
| Water | 59.50 | 59.10 | 55.58 | 52.97 |
| Borax | 0.37 | 0.37 | 0.37 | 0.37 |
| Acid-modified C150 Starch | 1.60 | 1.60 | 1.60 | 1.60 |
| 45% KOH | 0.75 | 0.75 | 0.818 | 0.864 |
| METASOL D3TA | | 0.40 | 0.40 | 0.40 |

The emulsions of Table 3 may be mixed with water, and gypsum may be added to the water emulsion mixture. The water/emulsion/gypsum mixture may then be formed into a gypsum product.

In an alternative embodiment, a wax emulsion useful in making gypsum products may include lignosulfonate or lignosulfate, as illustrated in the following Table 4.

TABLE 4

| Component<br>Parameter | Emulsion H | Emulsion I | Emulsion J |
|---|---|---|---|
| | (amount of component, grams) | | |
| Wax 3816 | 134.0 | 132.0 | 130.0 |
| Montan Wax | 12.0 | 12.0 | 12.0 |
| 319H | 10.0 | 4.0 | 6.0 |
| Sodium lignosulfonate | 4.0 | 4.0 | 4.0 |
| Water | 239.0 | 237 | 237 |
| Borax | 1.5 | 1.5 | 1.5 |
| Corn Starch | 6.5 | 6.5 | 6.5 |
| KOH | 3.0 | 3.0 | 3.0 |

In still other embodiments, a useful wax emulsion may contain carboxymethylcellulose. Such emulsions are useful with lignocellulosic products. One example of a carboxymethylcellulose-containing wax emulsion for use in a gypsum slurry useful for the manufacture of gypsum products comprises a nonsaponifiable wax, a saponified wax, an alkyl phenol component, a dispersant/surfactant, a carboxymethylcellulose component, and water. In a particular embodiment, the nonsaponifiable wax may comprise about 33% to about 35% of the emulsion, by weight, the saponified wax may comprise about 3% to about 5% of the emulsion, by weight, the alkyl phenol component may comprise about 0.5% to about 2.5% of the emulsion, by weight, the dispersant may comprise about 0.5% to about 2% of the emulsion, by weight, and the carboxymethylcellulose component may comprise about 0.2% to about 5% of the emulsion, by weight.

Emulsions described herein comprise a wax component comprising a nonsaponifiable wax and a saponifiable wax.

A suitable saponifiable wax has an acid value or a saponification value and a melting point greater than about 180° F. (about 82° C.).

Preferably, the waxes do not contain more than about 5% (by weight) polar compounds as impurities.

The wax component may be present in an amount of about 25 percent by weight (wt. %) to about 50 wt. %, based on the total weight of the emulsion, preferably about 30 wt. % to about 40 wt. %. Preferably, the wax component comprises a combination of a nonsaponifiable wax having a melting point of greater than or equal to about 120° F. and a saponifiable wax. The nonsaponifiable wax may comprise about 25 wt. % to about 44 wt. % of the total weight of the emulsion, and the saponifiable wax may comprise about 0.5 wt. % to about 5 wt. % of the total weight of the emulsion. A preferred combination of waxes is a combination of a paraffin wax such as Honeywell 3816 as the first wax and a saponifiable wax such as montan wax. In one embodiment, the wax component comprises paraffin wax in an amount of about 25 wt. % to about 45 wt. %, preferably about 30 wt. % to about 40 wt. %, and saponifiable wax in an amount of about 2.5 wt. % to about 5 wt. %, preferably about 3.5 wt. % to about 4.5 wt. %, based on the total weight of the emulsion.

A strongly basic compound as described herein is added to the emulsion mixture to saponify the saponifiable wax. The saponifier may be provided in an amount of about 0.15% to about 4.5%, optionally about 0.5% to about 3%, of the emulsion, by weight. Optionally, concentrated aqueous saponifier may be provided in an amount of about 0.5 to about 3% by weight of the emulsion; ammonium hydroxide may be added in solid form in an amount of about 0.15 to about 3% by weight of the emulsion. The amount of saponifier may be varied with the type of saponifiable wax used, or with the type of wood. As a result of the saponifier, an emulsion as described herein may have a pH of about 8.5 to about 12.5, for example, a pH of about 8.5 to about 9.5.

Exemplary carboxymethylcellulose materials useful in these emulsions have molecular carbon chain lengths of about 20 to about 50 carbons. An example of a suitable carboxymethylcellulose is carboxymethylcellulose sodium, available from Penn Carbose, Somerset, Pa., under the trade designation LT-30, which is described as having carbon chain lengths of about 26 to 30 carbons. Other suitable carboxymethylcellulose materials include Penn Carbose LT-20 and LT-42. The carboxymethylcellulose and the product of its reaction with the saponifier or with any other component in the emulsion are referred to herein as the "carboxymethylcellulose component".

A salt of polynaphthalenesulfonic acid is useful in the emulsions described herein and, without wishing to be bound by theory, is believed to act as a dispersant/surfactant. The salt may be the product of an in-situ reaction of polynaphthalenesulfonic acid and a saponifier, e.g., an alkali metal hydroxide. One commercially available polynaphthalenesulfonic acid is DISAL GPS which may be obtained from Handy Chemical, Montreal, Quebec, Canada. The acid and acid salt are referred to collectively as a polynaphthalenesulfonic acid component or, more broadly (to include substitute materials), as the dispersant/surfactant. The dispersant/surfactant may comprise about 0.1% to about 5% of the emulsion, by weight, optionally about 0.25 wt. % to about 5 wt. %.

Incorporating an alkyl phenol into emulsions has been found to facilitate achieving low water absorption in lignocellulosic composite products. Preferably, the alkyl phenol is chosen so that the average carbon chain length of the alkyl portion matches, i.e., is approximately the same as or is close to, the average carbon chain length of the carboxymethylcellulose. For example, an alkyl phenol of average chain length in the range of about $C_{24}$ to about $C_{34}$ may be used in an emulsion comprising carboxymethylcellulose having an average chain length of about 26 to about 32 carbons, e.g., Carbose LT-30 carboxymethylcellulose.

The amount of alkyl phenol component present in the emulsion may be about 0.25 wt. % to about 10 wt. %, optionally about 0.5 wt. % to about 2.5 wt. % based on the total weight of the emulsion.

One method of manufacture for the emulsions described herein results in time, energy, operator, and production efficiencies. The method involves mixing the ingredients of the emulsion in a single vessel and then conveying the mixture of a homogenizer under conditions such as the following. An advantage of this method is that the emulsion mixture is prepared in a single vessel; it is not necessary to prepare and separately store partial mixtures of the ingredients of the emulsion in separate vessels before combining them together.

In one embodiment of a 'single vessel' method, the nonsaponifiable wax (e.g., 3816 wax, further described below) is melted and stored in molten form, e.g., at about 10° F. above its melt point temperature, and water is provided at a temperature that will not cause the wax to solidify. The vessel is then charged in the following illustrative manner:

a. Charge the melted nonsaponifiable wax, e.g., 3816 wax, at a temperature of about 189° F. to about 192° F. (about 87° C. to about 89° C.);
 b. Start heat and agitation;
 c. Charge molten saponifiable wax and alkyl phenol with continued agitation;
 d. Charge a majority of the water, e.g., 95%, and continue agitation;
 e. Charge the dispersant/surfactant, (e.g., DISAL polynaphthalenesulfonic acid, further described elsewhere herein), carboxymethylcellulose and saponifier;
 f. Charge the remaining water—preferably including the water used to rinse the tubes calculated and subtracted out of the total;
 g. Bring the tank up to temperature, e.g., about 190° F. to about 210° F. (about 88° C. to about 100° C.);
 h. Continue to agitate while maintaining temperature for about 30 to about 150 minutes;
 i. Put through homogenizer at about 1500 to about 3500 PSI (about 10 megaPascals (MPa) to about 24 MPa);
 j. Cool, optionally in process that provides two exotherms, including a first exotherm between the exit temperature from the homogenizer to a temperature above ambient, and a second exotherm to ambient (storage) temperature. For example, the emulsion composition is passed from the homogenizer to a cooler to achieve a first exotherm of, e.g., about 10° F. to about 20° F. degrees lower than the homogenizer exit temperature, and then to a cooling tank to achieve a second exotherm of, e.g., about an additional 5° F. to about 15° F. lower, optionally under agitation. In one embodiment, the first exotherm may occur by cooling from about 130° F.

to about 110° F., and the second exotherm may occur by cooling from about 110° F. to about 70° F.

Without wishing to be bound by any particular theory, using a two-exotherm cooling process allows a phasing process of the formation of the emulsion to proceed to completion. As a result, the viscosity of the emulsion is more stable over time and the emulsion is more stable when subject to shear agitation than if a single exotherm cooling process is used. In an alternative method of preparing the emulsion, a batch process may be used in which a first premix comprising the molten waxes and alkylphenol may be prepared, and a second premix (an aqueous premix) comprising the water, carboxymethylcellulose and polynaphthalenesulfonic acid and saponifier may be prepared, and the first and second premixes may then be combined in a mixing tank for a time sufficient at least for the waxes to become saponified, e.g., for one to three hours, and the resulting mix may then be passed to a homogenizer and cooled as described above.

Illustrative ranges of ingredients in some embodiments of emulsions described herein are provided in Table 5 below.

TABLE 5

ILLUSTRATIVE EMBODIMENTS (CMC)

| Component | Typical Amount (% weight basis) |
| --- | --- |
| Nonsaponifiable Wax | 33–35 |
| Saponifiable Wax | 3–5 |
| Alkyl Phenol | 0.5–2.5 |
| Polynaphthalenesulfonic Acid | 0.5–2 |
| Carboxymethylcellulose | 0.2–5 |
| Saponifier | Amount used depends on amount of saponifiable wax; typically 0.5–3 |
| Water | Balance (to 100) |

The following Table 6 provides example proportions of ingredients in a specific embodiment of an emulsion as described herein.

TABLE 6

| Component- Emulsion K | Weight % |
| --- | --- |
| Wax 3816 | 33.00 |
| Saponifiable Wax | 3.00 |
| Alkyl Phenol | 0.50 |
| Polynaphthalenesulfonic Acid (DISAL GPS) | 0.50 |
| Carboxymethylcellulose | 0.2 |
| 45% KOH (saponifier) | 0.75 |
| Water | Balance (to 100) |

Such an emulsion may have a viscosity of about 10 to about 100 centipoise, measured on a Brookfield viscometer. One sample emulsion had a viscosity of 9 cps at about 40% solids.

The emulsions described herein, and others, when incorporated into a gypsum slurry, are useful in the production of gypsum products, and the preservatives disclosed herein may be used with all of them.

EXAMPLE

A wax emulsion formulation was prepared with the following components: G Wax (a paraffin wax) 33%, Montan wax 3.3%, alkyl phenol 0.5%, Disal 0.5%, potassium hydroxide 0.75%, ammonium hepta molybdonate 0.01%, starch 0.09%, polyfon H (lignosulfonic acid, sodium salt) 0.5%, water 61.35%. To this wax emulsion was post-added 0.2% thiabendazole, commercially available from Supreme Chemical of Cumming, Ga. under the trade designation MC-2. The wax emulsion was used to prepare a gypsum product. The resulting gypsum product was tested according to ASTM D3273. During this four week test, a sample of the subject material, such as a gypsum board, is placed in a closed chamber along with potting soil and mold cultures at a constant temperature of about 90° F. (32.2° C.) and relative humidity of 95% to 98%. The condition of the test sample is monitored weekly to determine the extent, if any, of mold growth. The sample prepared as described above exhibited no biological growth during the first weeks of the test.

In other tests, test emulsions as described above was used to prepare sample particle board coupons comprising a urea-formaldehyde binder. Some test emulsions contained 1% thiabendazole, others 2%, by weight of the wax in the emulsions. The emulsion was added to the furnish from which the coupons were formed in an amount of 0.4% solids, by weight of the furnish. Some of the coupons were soaked in water for twenty-four hours before testing. For the test, various soaked and non-soaked coupons were placed in various environments including constant humidity conditions (72° F. (22.2° C.), 72% relative humidity (RH)), outdoor rooftop environmental conditions (exposed to air but shielded from direct impingement by precipitation); and indoors in an uncontrolled warehouse and in a laboratory environment, beside a water bath. Control coupons prepared and treated similarly were also place in these environments. After the first week, the control coupons showed visible biological growth, but after six weeks, none of the sample coupons made with thiabendazole had any visible growth thereon.

Without wishing to be bound by any particular theory, it is believed that visual comparative evaluation of sample gypsum products made with wax emulsions containing thiabendazole to other gypsum products shows that crystals believed to be thiabendazole are embedded in the gypsum solids. This is believed to indicate that thiabendazole and the related compounds identified above, are carried by the wax into the gypsum while the gypsum slurry is wet, and then, as crystallize as the gypsum slurry is dehydrated to form the gypsum product and the wax emulsion is broken, the preservative reverts to its crystalline form and becomes embedded in the gypsum crystal. Thus, the preservative is impregnated into, and may be bonded to, the gypsum crystal structures, rather than merely residing on the surface of the product or being limited to residing in discrete agglomerations of wax that may remain after the wax emulsions are broken. The incorporation of the preservative into the gypsum extends the effective life of the preservative because the preservative is less likely to leech from the internal structure of the gypsum crystals than from the surface of the gypsum product or from wax agglomerations therein. It may also be a contributing factor to the increased product strength noted in sample gypsum products containing this preservative.

Optionally, any effective amounts of other preservatives may also be used in the gypsum products. Such preservatives include e.g., bactericides/fungicides, mildewcides, or other biocides, may optionally be included in a gypsum product by incorporating the preservative into the emulsion or into the gypsum-containing slurry. One example of a preservative suitable for gypsum products is a bactericide/fungicide known commercially as METASOL D3TA, which comprises 3,5-dimethyl-tetrahydro -1,3,5,2H thiadiazine-2-thione. METASOL D3TA may be obtained from Ondo-Nalco, Houston, Tex. Mildewcide can include any commercially available mildewcide including formaldehyde. Other suitable biocides include bis-thio-benzene, propiconazole and bis(tributyltin) oxide.

Preservatives useful in lignocellulosic products including, e.g., GWF products and other gypsum products that contain wood fibers or other lignocellulosic material, and which might optionally be used in addition to thiabendizole and/or the preservatives related thereto as disclosed herein, may be inorganic or organic, and may include, for example, biocides such as insecticides, fungicides, bactericides, and combinations comprising one or more of the foregoing biocides. The biocide may be chosen according to (1) the target organism; (2) solubility characteristics; (3) stability to the temperature and pH; and other conditions found in the manufacture of the composites. Biocides include substances that kill or inhibit the growth of microorganisms such as molds, slimes, fungi, bacteria, etc. Insecticides, fungicides and bactericides are all examples of biocides. Fungicides include substances that kill or inhibit the growth of fungi. Bactericides include agents that kill bacteria. Insecticides are agents that kill insects. More specific examples of biocides include, but are not limited to, chlorinated hydrocarbons, organometallics, halogen-releasing compounds, metallic salts, organic sulfur compounds, and phenolics. Preferred biocides include but are not limited to chromated copper arsenate (CCA); such as ammoniacal copper quaternary ammonium (ACQ), ammonial copper zinc arsenate (ACZA), copper bis(dimethyldithiocarbamate) (CDDC), ammoniacal copper citrate and copper azole, copper naphthenate, zinc naphthenate, quaternary ammonium salts, pentachlorophenol, tebuconazole (TEB), chlorothalonil (CTL), chlorpyrifos, isothiazolones, propiconazole, other triazoles, pyrethroids, and other insecticides, imidichloprid, oxine copper and the like, and combinations comprising one or more of the foregoing biocides. In addition to the organic biocides, nanoparticles with variable release rates that incorporate such inorganic preservatives as boric acid, sodium borate salts, zinc, zinc borate, silicated borate, copper salts and zinc salts may be used.

Suitable general microbicides include, for example, 3-isothiazolones, 3-iodo-2-propynylbutylcarbamate, 1,2-dibromo-2,4-dicyanobutane, methylene-bis-thio-cyanate (MBT), 2-thiocyano-methylthiobenzothiazole, tetrachloroisophthalo-nitrile, 5-bromo-5-nitro-1,3-dioxane, 2-bromo-2-nitropropane-1,3-diol, 2,2-di-bromo-3-nitrilopropionamide (DBNPA), N,N'-dimethylhydroxyl-5,5'-dimethylhydantoin, bromochlorodimethylhydantoin, 1,2-benzisothiazolin-3-one, 4,5-tri-methylene-2-methyl -3-isothiazolone, 5-chloro-2-(2,4-dichlorophenoxy)-phenol, 3,4,4'-trichlorocarbanilide, copper naphthenate, copper-8-hydroxy-quinoline, zinc borate, boric acid, trimethyl boron, zinc oxide, glutaraldehyde, 1,4-bis(bromo-acetoxy)-2-butene, 4,5-dichloro-1,1-dithiacyclopentene-3-one, chlorothalonil, quaternary ammonium based compounds, and combinations comprising one or more of the foregoing microbicides.

Suitable fungicides include, for example, zinc dimethyl dithiocarbamate, 2-methyl-4-t-butylamino-6-cyclopropylamino-s-triazine, 2,4,5,6-tetrachloroisophthalonitrile, N,N-dimethyl dichlorophenyl urea, copper thiocyanate, N -(fluorodichloromethylthio)phthalimide,N,N-dimethyl-N'-phenyl-N'-fluorodichloromethylthiosulfamide; copper, sodium and zinc salts of 2-pyridinethiol-1-oxide; tetramethylthiuram disulfide, 2,4,6-trichlorophenyl-maleimide, 2,3,5, 6-tetrachloro-4-(methylsulfonyl)-pyridine, diiodomethyl p-tolyl sulfone, phenyl (bispyridil) bismuth dichloride, 2-(4-thiazolyl)-benzimidazole, pyridine triphenyl borane, phenylamides, halopropargyl compounds, propiconazole, cyproconazole, tebuconazole and 2-haloalkoxyaryl-3-isothiazolones (such as 2-(4-trifluoro-methoxyphenyl)-3-isothiazolone, 2-(4-trifluoromethoxy-phenyl)-5-chloro-3-isothi-azolone, 2-(4-trifluoromethoxyphenyl)-4,5-dichloro-3-isothiazolone), and combinations comprising one or more of the foregoing fungicides.

The fungicide may be an agricultural fungicide such as, for example, dithiocarbamate and derivatives such as ferbam, ziram, maneb (manganese ethylenebisdithio-carbamate), mancozeb, zineb (zinc ethylenebisdithiocarbamate), propineb, metham, thiram, the complex of zineb and polyethylene thiuram disulfide, dazomet, and mixtures of these with copper salts; nitrophenol derivatives such as dinocap, binapacryl and 2-sec-butyl-4,6-dinitrophenyl isopropyl carbonate; heterocyclic structures such as captan folpet, glyodine, dithianon, thioquinox, benomyl, thiabendazole, vinolozolin, iprodione, procymidone, triadimenol, triadimefon, bitertanol, fluoroimide, triarimol, cycloheximide, ethirimol, dodemorph, dimethomorph, thifluzamide and quinomethionate; miscellaneous halogenated fungicides such as: chloranil, dichlone, chloroneb, tricamba, dichloran and polychloronitrobenzenes; fungicidal antibiotics such as: griseofulvin, kasugamycin and streptomycin; miscellaneous fungicides such as diphenyl sulfone, dodine, methoxyl, 1-thiocyano-2,4-dinitrobenzene, 1-phenyl -thiosemicarbazide, thiophanate-methyl and cymoxanil; acylalanines such as furalaxyl, cyprofuram, ofurace, benalaxyl, and oxadixyl; fluazinam, flumetover, phenylbenzamide derivatives such as those disclosed in EP 578,586-A, amino acid derivatives such as valine derivatives disclosed in EP 550,788-A, methoxyacrylates such as methyl (E)-2-(2-(6-(2-cyanophenoxy) pyrimidin-4-yloxy)phenyl)-3-methoxyacrylate, benzo(1,2, 3)thiadia -zole-7-carbothioic acid S-methyl ester, propamocarb, imazalil, carbendazim, myclobutanil, fenbuconazole, tridemorph, pyrazophos, fenarimol, fenpiclonil, pyrimethanil, and combinations comprising one or more of the foregoing fungicides.

Combination bactericides/fungicides can be included in the preservative compositions. An example of a bactericide/ fungicide is METASOL D3TA, which is 3,5-dimethyl-tetrahydro-1,3,5,2H-thiadiazine-2-thione available from Ondo-Nalco, Houston, Tex.

Suitable insecticides include, for example, acephate, aldicarb, α-cypermethrin, azinphos-methyl, bifenthrin, binapacryl, buprofezin, carbaryl, carbofuran, cartap, chlorpyrifos, chlorpyrifos methyl, clofentezine, cyfluthrin, cyhexatin, cypermethrin, cyphenothrin, deltamethrin, demeton, demeton-S-methyl, demeton-O -methyl, demeton-S, demeton-S-methyl sulfoxide, demephion-O, demephion-S, dialifor, diazinon, dicofol, dicrotophos, diflubenzuron, dimethoate, dinocap, endosulfan, endothion, esfenvalerate, ethiofencarb, ethion, ethoate-methyl, ethoprop, etrimfos, fenamiphos, fenazaflor, fenbutatin-oxide, fenitrothion, fenoxycarb, fensulfothion, fenthion, fenvalerate, flucycloxuron, flufenoxuron, fluvalinate, fonofos, fosmethilan, furathiocarb, hexythiazox, isazophos, isofenphos, isoxathion, methamidophos, methidathion, methiocarb, methomyl, methyl parathion, mevinphos, mexacarbate, monocrotophos, nicotine, omethoate, oxamyl, parathion, permethrin, phorate, phosalone, phosmet, phosphamidon, pirimicarb, pirimiphos-ethyl, profenofos, promecarb, propargite, pyridaben, resmethrin, rotenone, tebufenozide, temephos, TEPP, terbufos, thiodicarb, tolclofos-methyl, triazamate, triazophos, vamidothion, and combinations comprising one or more of the foregoing insecticides.

Antitermite agents may be used in addition to other insecticides as long as they do not detract from the properties of the other insecticides. Antitermite agents include Permetorin, Imidachlopride, Etpfenplox, and combinations comprising one or more of the foregoing agents.

Specific examples of suitable preservatives include alkylammonium compounds such as didecyldimethylammonium chloride (DDAC), BARDAP (N,N -didecyl-N-methylpolyoxyethylammonium propionate), copper benzalconium chloride or N-alkylbenzyldimethylammonium chloride (BKC); metal salts of naphthetic acid such as copper naphthenate (NCU) or zinc naphthenate (NZN); metal salts of versatic acid such as zinc versatate; triazole type compounds such as Cyproconazole [(2RS,3RS;2RS,3SR) -2-(4-chlorophenyl)-3-(cyclopropyl-1-(1H-1,2,4-triazol-1-yl)butan-2-01], Tebuconazole [(RS)-1-p-chlorophenyl-4,4-dimethyl-3-(1H-1,2,4-triazol-1-ylmethyl)pentan-3-01], Propiconazole [1-[2-(2,4-dichlorophenyl)-4-propyl-1,3-dioxoran-2-ylmethyl]-1H-1,2,4-triazole], 1-[2-(2',4-dichlorophenyl-1,3-dioxoran-2-ylmethyl]-1H-1,2,4-triazol-1-ethanol or 1-[2-(2',4'-dichlorophenyl)-4-propyl-1,3-dioxoran-2-ylmethyl]-1H-1,2,4-triazol-1-ethanol; and organic iodine compounds such as IF-1000[4-chlorophenyl-3-iodopropargyl formal], IPBC [3-iodo-2-propynyl-N-butylcarbamate], and combinations comprising one or more of the foregoing preservatives.

The lignocellulosic preservatives may be used in combination. Preferred combinations include Cyproconazole and DDAC; Cyproconazole and BARDAP; Tebuconazole and Propiconazole; and the like.

A compound which is effective to inhibit or prevent growth of wood rot soil bacteria and wood soft rot fungi, mainly wood soft rot fungi such as chaetomium globosum, may also be used as a preservative. Such compounds include p-cumylphenol (PCP), and its salts such as the sodium salt of p-cumylphenol, the ethylamine salt of p -cumylphenol, and combinations comprising one or more of the foregoing wood preservatives. PCP inhibits the growth of wood rot soil bacteria, ascomycetes and imperfect fungi, and it is effective as an antimold agent and antitermite agent. Therefore, PCP is particularly preferable. PCP can exhibit a sufficient effect to wood materials in the treatment amount (application amount) of about 200–1,000 grams per cubic meter of wood (g/m3).

All ranges disclosed herein are inclusive and combinable, e.g., the ranges of "about 120° to about 165° F., optionally from 135° to 145° F.", are inclusive of the endpoints and all intermediate values of the ranges and combinations thereof, including, e.g., about 120° to about 145° F., about 130° to about 150° F., etc. The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

While certain embodiments and best mode of the present invention are described herein, these embodiments are merely illustrative. It will be apparent to those skilled in the art that modifications may be made therein without departing from the spirit of the invention and the scope of the appended claims.

What is claimed is:

1. An emulsion comprising water as the continuous phase, at least one wax, an alkyl phenol, polynaphthalenesulfonic acid, a carboxymethylcellulose, and a preservative having the general structure:

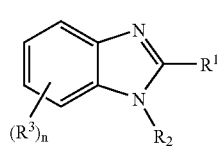

(I)

wherein $R^1$ is a heterocycle containing nitrogen and sulfur which is optionally substituted with $C_1$–$C_6$ alkyl; $R^2$ is hydrogen or $C_1$–$C_6$ alkyl n is 0, 1, 2, or 3; each instance of $R^3$ is independently hydrogen, $C_1$–$C_6$ alkyl, phenoxy, $C_1$–$C_6$ alkoxy, halo, amino, $C_1$–$C_6$ alkylamino, di $C_1$–$C_6$ alkyl amino, imidazolyl, thiazolyl, isothiazolyl, thiadiazolyl, thienyl, furyl, pyrryl, naphthyl, phenyl, halophenyl, $C_1$–$C_6$ alkyl phenyl, or $C_1$–$C_6$ alkoxyphenyl.

2. A method of making a gypsum product comprising forming a slurry from gypsum, water, and the wax-in water emulsion of claim 1 and forming the slurry into a solid product.

3. The method of claim 2 wherein the wax emulsion comprises a non-saponifiable wax, a saponifiable wax, an alkyl phenol, polynaphthalenesulfonic acid, a carboxymethylcellulose, a saponifier, water and the preservative comprises a benzimidazole compound, thiabendazole or a mixture of at least one or more thereof.

4. The emulsion of claim 1, wherein $R^1$ is thiazolyl, isothiazolyl, or thiadiazolyl.

5. The emulsion of claim 1, wherein $R^2$ is hydrogen.

6. The emulsion of claim 1, wherein $R^1$ is thiazolyl, isothiazolyl, or thiadiazolyl, and $R^2$ is hydrogen.

7. An emulsion comprising a non-saponifiable wax, a saponifiable wax, an alkyl phenol, polynaphthalenesulfonic acid, a carboxymethylcellulose, a saponifier, water and a preservative having the general structure:

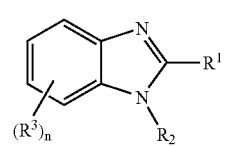

(I)

wherein $R^1$ is a heterocycle containing nitrogen and sulfur which is optionally substituted with $C_1$–$C_6$ alkyl; $R^2$ is hydrogen or $C_1$–$C_6$ alkyl n is 0, 1, 2, or 3; each instance of $R^3$ is independently hydrogen, $C_1$–$C_6$ alkyl, phenoxy, $C_1$–$C_6$ alkoxy, halo, amino, $C_1$–$C_6$ alkylamino, di $C_1$–$C_6$ alkyl amino, imidazolyl, thiazolyl, isothiazolyl, thiadiazolyl, thienyl, furyl, pyrryl, naphthyl, phenyl, halophenyl, $C_1$–$C_6$ alkyl phenyl, or $C_1$–$C_6$ alkoxyphenyl.

8. The emulsion of claim 7 wherein the preservative comprises a benzimidazole compound.

9. The emulsion of claim 8 wherein the preservative comprises 0.01 to 10 wt. % of the emulsion.

10. The emulsion of claim 7 wherein the preservative comprises thiabendazole.

11. The emulsion of claim 10 wherein the preservative comprises 0.01 to 10 wt. % of the emulsion.

12. The emulsion of claim 7 wherein the preservative comprises 0.01 to 10 wt. % of the emulsion.

13. An emulsion of claim 7 comprising water in an amount of 55% to about 65% by weight based upon the total weight of the emulsion; an alkali metal hydroxide in an amount of about 0.5% to about 1% by weight based upon the total weight of the emulsion and a carboxymethylcellulose in an amount of about 0.2 to about 5.0% by weight of the total weight of the emulsion.

14. The emulsion of claim 13 wherein the preservative comprises a benzimidazole compound, thiabendazole or a mixture of at least one or more thereof.

15. The emulsion of claim 7 comprising 33 wt % non-saponifiable wax, 3 wt. % saponifiable wax, 0.5 wt. % alkyl phenol, 0.5 wt. % polynaphthalenesulfonic acid, 0.2 wt % carboxymethylcellulose, a saponifier, and water.

16. The emulsion of claim 15 wherein the preservative comprises a benzimidazole compound, thiabendazole or a mixture of at least one or more thereof.

17. A method for improving the water resistance of a lignocellulosic composite product prepared by mixing lignocellulosic material with a binder to form a mixture and solidifying the mixture in a selected configuration to form the composite product, the method comprising adding to the mixture an emulsion as defined in claim 7.

18. A lignocellulosic composite product made by mixing lignocellulosic material with a binder to form a mixture, adding to the mixture an emulsion as defined in claim 7, and forming the mixture and the emulsion therein into a solid product.

19. The emulsion of claim 7, wherein $R^1$ is thiazolyl, isothiazolyl, or thiadiazolyl.

20. The emulsion of claim 7, wherein $R^2$ is hydrogen.

21. The emulsion of claim 7, wherein $R^1$ is thiazolyl, isothiazolyl, or thiadiazolyl, and $R^2$ is hydrogen.

22. A method of making a wax emulsion, comprising making an emulsion comprising at least one wax, an alkyl phenol, polynaphthalenesulfonic acid, a carboxymethylcellulose, and water without a preservative having the general structure:

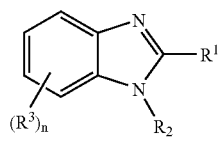
(I)

wherein $R^1$ is a heterocycle containing nitrogen and sulfur which is optionally substituted with $C_1$–$C_6$ alkyl; $R^2$ is hydrogen or $C_1$–$C_6$ alkyl n is 0, 1, 2, or 3; each instance of $R^3$ is independently hydrogen, $C_1$–$C_6$ alkyl, phenoxy, $C_1$–$C_6$ alkoxy, halo, amino, $C_1$–$C_6$ alkylamino, di $C_1$–$C_6$ alkyl amino, imidazolyl, thiazolyl, isothiazolyl, thiadiazolyl, thienyl, furyl, pyrryl, naphthyl, phenyl, halophenyl, $C_1$–$C_6$ alkyl phenyl, or $C_1$–$C_6$ alkoxyphenyl; and then adding the preservative having the general structure (I) thereto.

23. The meted of claim 22 comprising adding the preservative in a paste form.

24. The method of claim 22 comprising adding the preservative in the form of a mixture of the preservative with water in an amount of about 25% solids by weight of the water-preservative mixture.

25. The emulsion of claim 22, wherein $R^1$ is thiazolyl, isothiazolyl, or thiadiazolyl.

26. The emulsion of claim 22, wherein $R^2$ is hydrogen.

27. The emulsion of claim 22, wherein $R^1$ is thiazolyl, isothiazolyl, or thiadiazolyl, and $R^2$ is hydrogen.

28. A gypsum product comprising gypsum and a wax emulsion dispersed within the gypsum wherein the emulsion comprises at least one wax, an alkyl phenol, polynaphthalenesulfonic acid, a carboxymethylcellulose, water and a preservative having the general structure:

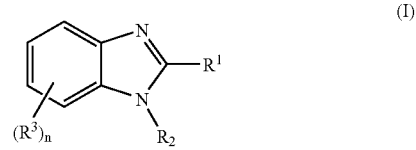
(I)

wherein $R^1$ is a heterocycle containing nitrogen and sulfur which is optionally substituted with $C_1$–$C_6$ alkyl; $R^2$ is hydrogen or $C_1$–$C_6$ alkyl n is 0, 1, 2, or 3; each instance of $R^3$ is independently hydrogen, $C_1$–$C_6$ alkyl, phenoxy, $C_1$–$C_6$ alkoxy, halo, amino, $C_1$–$C_6$ alkylamino, di $C_1$–$C_6$ alkyl amino, imidazolyl, thiazolyl, isothiazolyl, thiadiazolyl, thienyl, furyl, pyrryl, naphthyl, phenyl, halophenyl, $C_1$–$C_6$ alkyl phenyl, or $C_1$–$C_6$ alkoxyphenyl.

29. The gypsum product of claim 28 wherein the wax emulsion comprises a non-saponifiable wax, a saponifiable wax, an alkyl phenol, polynaphthalenesulfonic acid, a carboxymethylcellulose, a saponifier, water and the preservative and wherein the wax emulsion and preservative is dispersed within a slurry of gypsum prior to forming a dried gypsum product in a solid form to produce a gypsum product having the preservative in crystalline form dispersed throughout the core of the gypsum product.

30. The emulsion of claim 28, wherein $R^1$ is thiazolyl, isothiazolyl, or thiadiazolyl.

31. The emulsion of claim 28, wherein $R^2$ is hydrogen.

32. The emulsion of claim 28, wherein $R^1$ is thiazolyl, isothiazolyl, or thiadiazolyl, and $R^2$ is hydrogen.

* * * * *